United States Patent
Dolce et al.

(10) Patent No.: US 10,297,063 B2
(45) Date of Patent: May 21, 2019

(54) PERSONALIZED GAME PIECES

(71) Applicants: James Dolce, Penfield, NY (US); Ryan W. Moore, West Henrietta, NY (US)

(72) Inventors: James Dolce, Penfield, NY (US); Ryan W. Moore, West Henrietta, NY (US)

(73) Assignee: FUJIFILM NORTH AMERICA CORPORATION, Valhalla, NY (US)

( * ) Notice: Subject to any disclaimer, the term of this patent is extended or adjusted under 35 U.S.C. 154(b) by 77 days.

(21) Appl. No.: 15/713,279

(22) Filed: Sep. 22, 2017

(65) Prior Publication Data

US 2019/0096104 A1    Mar. 28, 2019

(51) Int. Cl.
| | | |
|---|---|---|
| *A63F 3/00* | (2006.01) | |
| *G06T 11/60* | (2006.01) | |
| *H04N 1/00* | (2006.01) | |
| *G06T 7/73* | (2017.01) | |
| *G06F 3/147* | (2006.01) | |
| *H04N 5/222* | (2006.01) | |

(52) U.S. Cl.
CPC .......... *G06T 11/60* (2013.01); *A63F 3/00697* (2013.01); *G06F 3/147* (2013.01); *G06T 7/73* (2017.01); *H04N 1/00249* (2013.01); *H04N 1/00278* (2013.01); *H04N 5/2224* (2013.01); *A63F 2003/007* (2013.01); *A63F 2003/00854* (2013.01); *A63F 2003/00892* (2013.01); *G06T 2207/30201* (2013.01)

(58) Field of Classification Search
CPC . G06T 11/60; G06T 7/73; G06T 2207/30201; A63F 3/00697; A63F 2003/007; A63F 2003/00854; A63F 2003/00892; G06F 3/147; H04N 1/00249; H04N 1/00278; H04N 5/2224
USPC ........................................................ 463/43
See application file for complete search history.

(56) References Cited

U.S. PATENT DOCUMENTS

| | | | | |
|---|---|---|---|---|
| 7,859,551 | B2 * | 12/2010 | Bulman ................. | G06Q 30/00 345/428 |
| 9,787,861 | B2 * | 10/2017 | Chen ...................... | G06T 11/60 |
| 2009/0094287 | A1 * | 4/2009 | Johnson ................. | G06Q 10/08 |
| 2014/0029022 | A1 * | 1/2014 | Johnson ................. | G06T 11/60 358/1.2 |
| 2017/0200286 | A1 * | 7/2017 | Brahmanapalli ....... | A47G 1/16 |

\* cited by examiner

*Primary Examiner* — Allen Chan
(74) *Attorney, Agent, or Firm* — Womble Bond Dickinson (US) LLP

(57) ABSTRACT

A method and apparatus for generating a game piece are disclosed. In one embodiment, the method comprises launching an application on a mobile device that has a camera; selecting a game character using the application; displaying an overlay for the selected game character in an image from a field of view of the camera, the overlay being an augmented reality layer; capturing an image of an individual in the field of view of the camera; sending the captured image to a printer that is coupled to the mobile device; and printing the captured image with a border of unequal size around the image, wherein printing the capture images comprises printing the captured image upside down to cause a border area larger at a top of the image than around other portions of the image for use in handling the image when using the image as part of a game piece.

22 Claims, 3 Drawing Sheets

PERSONALIZED GAME PIECES

FIELD OF THE INVENTION

Embodiments of the present invention relate to the field of gaming; more particularly, embodiments of the present invention relate to generating personalized game piece that may be used with a game (e.g., a board game).

BACKGROUND OF THE INVENTION

Personalization of products is often a customization that is performed in a certain area and such customization may take many forms. For example, many types of products are personalized, ranging from digital and print media, advertising, and sales, so that they meet the desires and/or needs of targeted individuals. This personalization has been extended to mobile devices where users opt for many customizations to get the mobile phone to perform a variety of desired functions and operations.

At the same time, the use of a mobile phone to capture images has grown to the point of nearly replacing the digital cameras that were once prevalent in the marketplace. In fact, the use of a mobile phone for taking pictures has been made so simple that even children of very young ages are able to easily take pictures themselves. Even so, the use of a mobile device to personalize a game experience isn't known to the inventors.

SUMMARY OF THE INVENTION

A method and apparatus for generating a game piece are disclosed. In one embodiment, the method comprises launching an application on a mobile device that has a camera; selecting a game character using the application; displaying an overlay for the selected game character in an image from a field of view of the camera, the overlay being an augmented reality layer; capturing an image of an individual in the field of view of the camera; sending the captured image to a printer that is coupled to the mobile device; and printing the captured image with a border of unequal size around the image, wherein printing the capture images comprises printing the captured image upside down to cause a border area larger at a top of the image than around other portions of the image for use in handling the image when using the image as part of a game piece.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A method and apparatus for creating personalized game pieces for use with games are disclosed. In one embodiment, the game pieces are used for a wide range of board games. In one embodiment, the game piece includes a printed image that is held in a game piece structure, such as a game piece stand. In one embodiment, the printed image is an Instax print of an individual that is printed by an Instax Share printer and a stand holds the print to create a game piece that is used when playing a board game. For example, if a group of people are playing a game such as Candy Land, rather than each player selecting a small wooden, colored game piece, they can choose a colored print holder/stand, take a picture with an Instax camera, and incorporate the resulting image into a game piece, thereby allowing the player to be themselves in the game.

In one embodiment, a mobile application running on a mobile device is able to add custom content to the image captured by the camera and subsequently printed. In one embodiment, the custom content represents a costume or a persona of a game character. The custom content augments the image of the player. Using a printer, such as, for example, an Instax Share printer, the image of the player is printed and combined with the stand to make a more elaborate game piece for use in the game.

Figure 1:
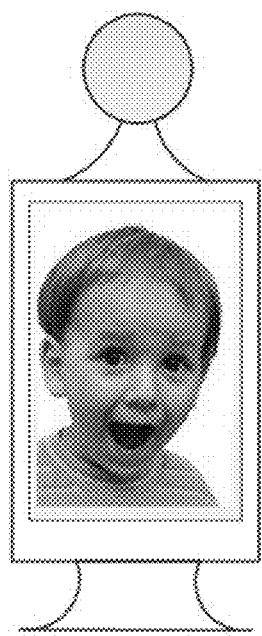
FIG. 1 illustrates an example of a game piece without custom content.
Figure 2:
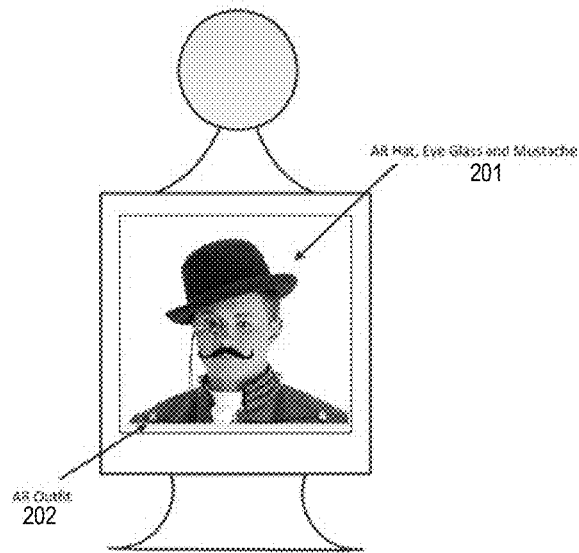
FIG. 2 illustrates an example of a game piece with augmented content.

FIG. 1 illustrates an example of a game piece without custom content. FIG. 2 illustrates an example of a game piece with augmented content. Referring to FIG. 2, the game piece includes costume elements 201 of a hat, eye glasses, and a mustache and costume element 202 that are part of an AR layer.

Figure 3:
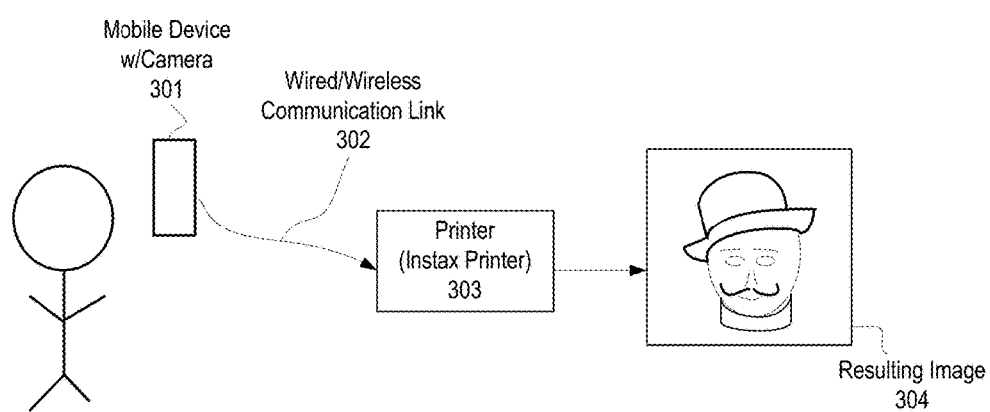
FIG. 3 is a block diagram of one embodiment of a system for generating a personalized game piece for a game.

In one embodiment, the image of the personalized game piece is created using a computing system. FIG. 3 is a block diagram of one embodiment of a system for generating an image that is used as part of the personalized game piece.

Referring to FIG. 3, the system includes a mobile device 301 and a printer 303 that are communicably coupled to each other via wired or wireless communication link 302. Mobile device 301 includes a camera, a display, one or more processors coupled to the display and the camera, and a memory coupled to the display, the camera and the processor. The memory stores instructions (e.g., one or more mobile applications such as the mobile application discussed above, a camera application for controlling the camera of the mobile device, software for controlling a communication interface of the mobile device, etc.) for execution by the one or more processors.

In one embodiment, the processor(s) executes the instructions to:

launch an application stored in the memory by which a user can select a game character and their associated costume for game piece creation, enable receipt of an input from the display indicating a selection of a game character that is being displayed on the display of mobile device 301 using this application, trigger a launch of the camera application in response to the user selecting a game character, access an overlay (AR layer) from a memory for the selected game character, and display on the display of mobile device 301, using a camera application, the overlay for the selected game character in an image of the camera's field of view. In one embodiment, the overlay is an augmented reality (AR) layer. In one embodiment, the overlay includes costume content associated a costume worn by the game character in the game.

For example, if the group of people is playing the board game Clue, in one embodiment, they launch a mobile application on their mobile device (e.g., mobile phone, computer, or tablet, etc.), thereby causing the application to run on the mobile device. Once running, a user is able to select the game such as Clue and select a game character they want to be in the game (e.g., Colonel Mustard). The "costume" for that player, which may include a mustache, glasses, etc., is then displayed in the camera application as an AR layer. The mobile device user aims the camera at the player and lines them up in the camera's field of view so the custom content displays correctly on the player. At this point, the mobile device user takes the picture to capture the image. The resulting image is sent to a printer, such as, for example, but not limited to, an Instax Share printer, to be printed and then subsequently used as part of the player's game piece.

In one embodiment, the AR layer of the game character's costume appears in the image of the camera's field of view. In other words, if the camera's field of view is displayed on the display of the mobile device, then the AR layer appears as part of the image before the image is captured. When the player enters the camera's field of view, the user of the camera may have to frame the player into the costume. This may be performed by moving the camera forward or backward to zoom in and out, respectively, and/or move the camera left or right with respect to the player, so that they appear in the costume with the correct size. This is because in one embodiment the AR layer is a top layer of static content that is positioned by the camera user over the image of the player. In alternative embodiments, the AR layer is dynamically sized to the player's image size in the camera's field of view. Thus, the AR layer resizes itself based on the size of the player in the image. In yet another embodiment, both the player's image and the AR layer are resized to create the personalized game piece image. In still yet another embodiment, individual elements in the AR layer are resized based on the size of the player image. This has the effect of resizing one or more portions of the game character's costume.

The processor causes the camera to capture an image of a player. In one embodiment, the processor sends an input to the camera application that causes the camera to capture the image of the player with the AR layer in the image. The capture may occur in response to the mobile device user selecting a button or other user interface element on the display of the mobile device.

After using the camera to capture the image of the player with the AR layer appearing in the image, the processor sends the image for printing by printer 303, which is communicably coupled to mobile device 301. The captured image is sent using a communication interface of mobile device 301. In one embodiment, the processor causes the captured image to be sent to printer 303 automatically in response to the user of mobile device 301 selecting a button or other user interface element on the display of mobile device 301 that causes the camera of mobile device 301 to take a picture. In one embodiment, the captured image is sent to printer 303 in response to the user of mobile device 301 selecting a print button or other user interface element on the display.

In one embodiment, the printed image is an image of the player represented as a game character that appears as the player is dressed up as the character. In one embodiment, in response to receiving the captured image, printer 303 prints the captured image with a border of unequal size around the image and upside down to cause a border area larger at a top of the image than around other portions of the image for use in handling the image when using the image as part of a game piece. In another embodiment, at least one of the border areas around the printed image, or portion thereof, is a non-image portion (e.g., one of the sides, top, bottom, corner etc.) of the print that the user can grab when using the game piece. In one embodiment, the printed image is an instant print image. In one embodiment, the printer comprises an Instax Share printer and the printed image is an Instax print.

In one embodiment, the application used to select the AR layer for a game piece also is used to create multiple game pieces for the same game. In such a case, the application may prompt the user to determine the number of game pieces they wish to create or prompts the user after each is created to determine if the user wants one or more additional game pieces created for a game. In one embodiment, when multiple game pieces are created for the same game, the application performs operations to ensure that all the game pieces are uniform by having the same quality, size, resolution, and/or other formatting. In one embodiment, such a case, each image is formatted to be uniform with the other game pieces being created.

Figure 4:
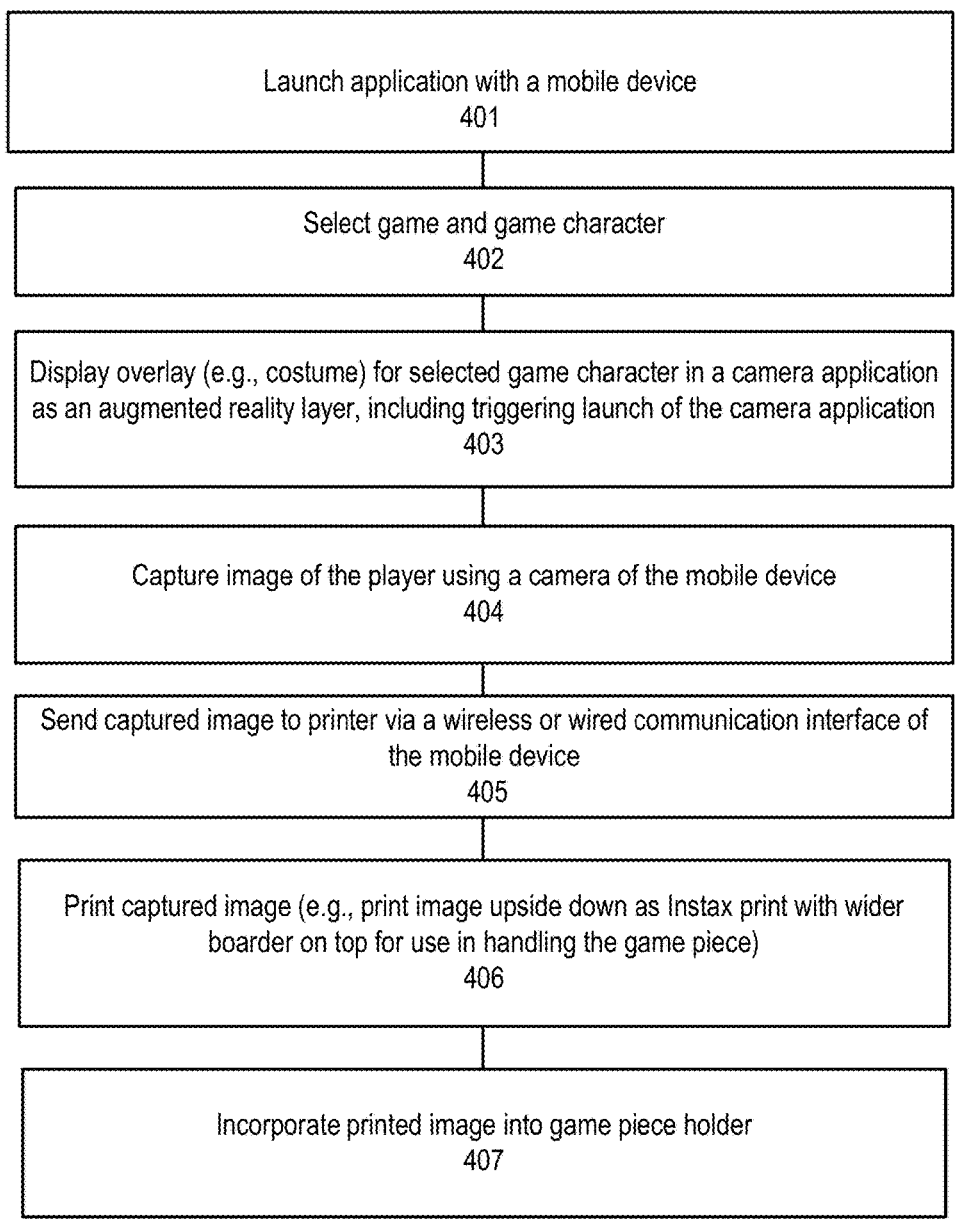
FIG. 4 is a flow diagram of one embodiment of a processor for generating a personalized game piece for a game.

FIG. 4 is a flow diagram of one embodiment of the process for generating a personalized game piece. The process is performed by processing logic that may comprise hardware (circuitry, dedicated logic, etc.), software (such as is run on a general purpose computer system or a dedicated machine), firmware, or a combination of the three. In one embodiment, the process is performed by the system described in FIG. 3.

Referring to FIG. 4, the process begins by processing logic launching an application on a mobile device that has a camera (processing block 401). In one embodiment, the application is a game piece image generation application that allows a user to select a game and one or more characters in the game for game piece personalization. In one embodiment, launching the application is performed by selecting an icon that is displayed on a display of the mobile device. The icon may be selected from a number of icons being displayed on the display. In one embodiment, the display is a touch screen display and the selection of the icon is performed by touching the touch screen display. In response there to, the display controller of the touch screen determines the location the user touched, determines which icon was being displayed at that location, and then launches the application. In an alternative embodiment, the user selects the application from a list of applications available on the mobile device.

After launching the application, processing logic selecting a game and a game character using the application (processing block 402). In one embodiment, the selection is made in the same way as the selection is made to launch the application. For example, the user may select the game and/or game character using a touch screen display of the mobile device. The selections may be made via selection of one or more icons or via the selection of the game and/or character from one or more lists.

After selecting a specific game character, processing logic displays an overlay for the selected game character in an image from a field of view of the camera, where the overlay is an augmented reality (AR) layer of a costume of the character in the game (processing block 403). The AR layer may be stored in a memory on the mobile device and is accessed from that memory in response to selection of the character by the user of the mobile device. Alternatively, the AR layer is stored remotely in a device (e.g., a server, database, etc.) and is downloaded to the mobile device in response to selection of a game character by the user. Note that although the process is described in terms of one AR layer, the process can be used with multiple AR layers at one time. In one embodiment, the display of the camera's field of view with the AR layer of the costume of the character in the game is displayed on a display of the mobile device using a camera application. That is, the camera application that controls image capture by the camera of the mobile device displays the field of view of the camera on the display of the mobile device along with the AR layer. In one embodiment, the camera application is launched in response to the launching of the application to generate the personalized game piece. In another embodiment, the camera application is launched in response to the selection of a game piece character by the user when interacting with the application to generate the personalized game piece.

Using the camera of the mobile device under control of the camera application, processing logic captures an image of an individual in the field of view of the camera with the AR layer overlaid thereon (processing block 404). In one embodiment, the capture is made in response to the user touching a camera button on the touch screen display of the mobile device.

Note that in one embodiment, the AR layer is static in that it size doesn't change. In such a case, the user taking a picture of an individual to create the personalized game piece may have to adjust the camera's location side-to-side and/or zooming in or out in order to locate the user's image in the field of view so that the user is properly positioned and sized to the costume elements (e.g., a hat or mustache such as in FIG. 2) in the AR layer so that their sizes look appropriate for the personalized game piece when printed. In another embodiment, the AR layer can be dynamically sized using controls on the touch screen display to allow the size of the costume elements to be modified to match the size of the individual's image in the field of view so that their sizes look appropriate for the personalized game piece when printed. Thus, in such a case, the AR layer is resized based on a size of an individual in the field of view of the camera.

Once the image has been captured, processing logic sends the captured image to a printer communicably coupled to the mobile device (processing block 405). The captured image may be sent via wired or wireless communication using a communication interface on the mobile device. In one embodiment, processing logic sends the captured image to the printer using wireless communication (e.g., WiFi, infrared, Bluetooth, etc.) via a wireless communication interface on the mobile device.

Using the printer, processing logic prints the captured image with a border of unequal size around the image (processing block 406). In one embodiment, the printed image is an instant print, such as, for example, an Instax print. In one embodiment, the printer is an Instax Share printer that prints Instax prints. In one embodiment, the printer prints the captured image with a border area around the image.

In one embodiment, the border area around the image has a different thickness on different sizes of the image and the image is printed with a larger border area at the top of the image in order to provide a larger area for a user to handle the game piece during game usage without having to touch the image of the game piece. In order to ensure that the larger border area is at the top of the printed image, in one embodiment, the printer prints the image upside down, which causes the larger border area to be at a top of the image. In another embodiment, at least one of the border areas around the printed image, or portion thereof, is a non-image portion (e.g., one of the sides, top, bottom, corner etc.) of the print that the user can grab when using the game piece.

In one embodiment, after printing the image, the image is incorporated into a game piece holder (processing block 407). In one embodiment, incorporating the image printed with the border into the game piece holder comprises inserting the image into a slit in the game piece holder. For example, the game piece holder may encompass a stand with a slit across the top into which the printed image may be placed or slid. In another embodiment, the game piece holder may include a frame-like structure into which the image may be inserted. For example, such a frame-like structure may have a slit in back and the printed image is inserted into the slit.

Figure 5:
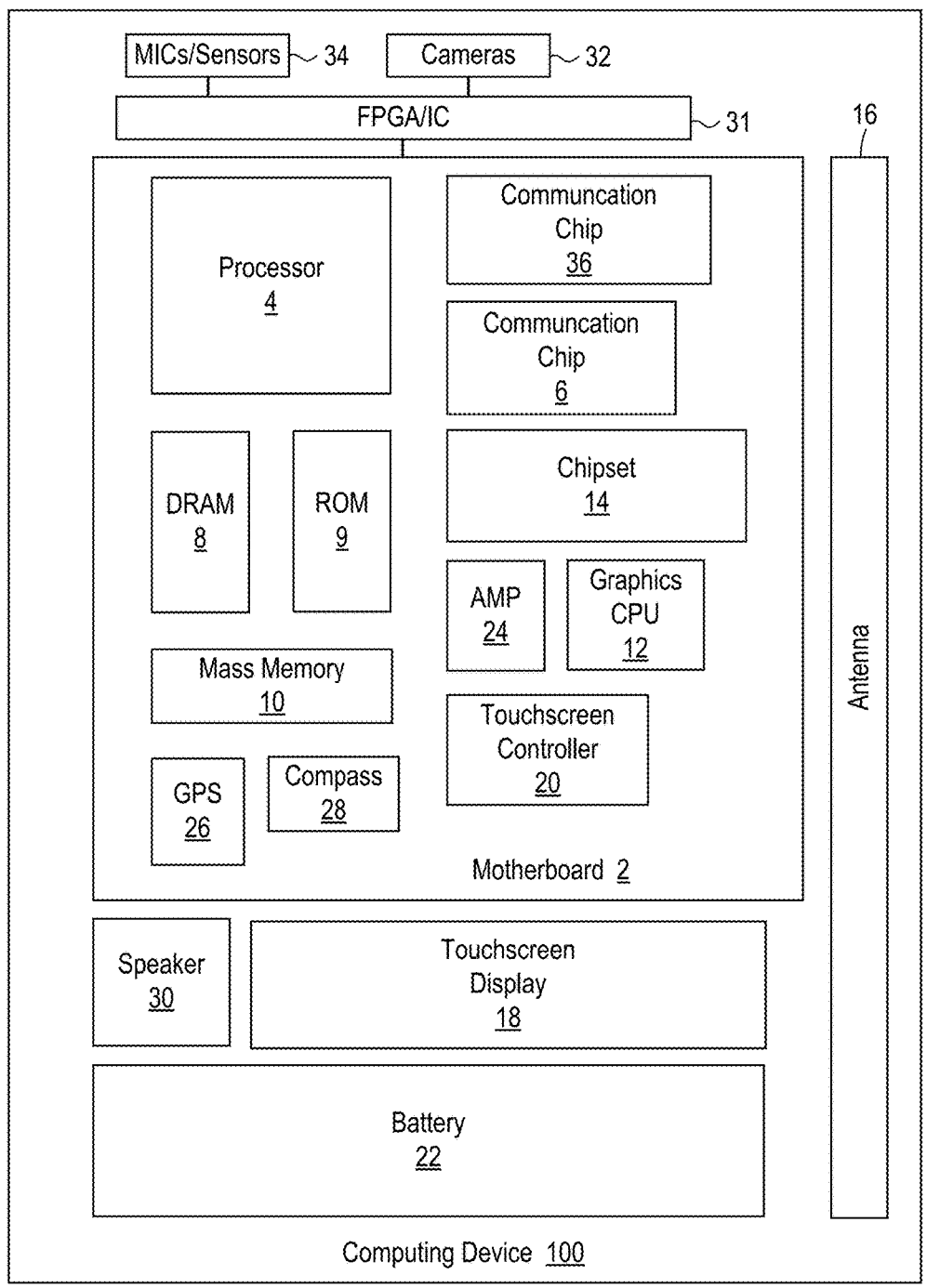
FIG. 5 is a block diagram of one embodiment of a portable image capture device.

FIG. 5 illustrates a portable image capture device 100 in accordance with one implementation of the mobile device described above. The imaging device 100 houses a system board 2. The board 2 may include a number of components, including but not limited to a camera array 32 as described above, a processor 4, and at least one communication package 6. The communication package may be coupled to one or more antennas 16. The processor 4 is physically and electrically coupled to the board 2. In one embodiment, device 100 includes one or more processors.

Depending on its applications, image capture device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera array 32, a microphone (or other sensor) array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

In one embodiment, camera array 32 and microphone/sensor array 34 are coupled to image processing chip 36 (e.g., an imaging signal processor) and/or to the processor 4, either directly or through the image chip, via FGPA/IC 31, which is described above. The image chip may take a variety of different forms, such as a graphics co-processor, or a separate dedicated imaging management module. Such a module or device may comprise logic, algorithms, and/or instructions operative to capture, process, edit, compress, store, print, and/or display one or more images. These processes may include using the AR layer with a camera to create a game piece image with an overlay (e.g., costume) in the captured image as described herein. In some embodiments, the imaging management module may comprise programming routines, functions, and/or processes implemented as software within an imaging application or operating system. In various other embodiments, the imaging management module may be implemented as a standalone chip or integrated circuit, or as circuitry comprised within the processor, within a CPU, within a graphics chip or other integrated circuit or chip, or within a camera module.

The communication package 6 enables wireless and/or wired communications for the transfer of data to and from the imaging device 100. Such communication could be with a printer (e.g., Instax Share printer) such as is described above. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

Cameras of camera array 32 may include all of the components of the camera or share resources, such as memory 8, 9, 10, processing 4 and user interface 12, 20, with other video device components and functions. The processor 4 is coupled to camera array 32 and to memory to receive frames and produce enhanced images, including images using the AR layer described above. In one embodiment, cameras of camera array 32 include an image capture sensor(s) and color filter array described above. In one embodiment, cameras of camera array 32 also include an image processing system, as described above.

In various implementations, the image capture device 100 may be a video camera, a digital single lens reflex or mirror-less camera, a cellular telephone, a media player, laptop, a netbook, a notebook, an ultrabook, a smartphone, a wearable device, a tablet, a personal digital assistant (PDA), an ultra mobile PC, or a digital video recorder. The image capture device may be fixed, portable, or wearable. In further implementations, the image capture device 100 may be any other electronic device that records a sequence of image frames and processes data.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   launching an application on a mobile device that has a camera;
   selecting a game character using the application;

displaying, on a display of the mobile device using a camera application, an overlay for the selected game character in an image from a field of view of the camera, the overlay being an augmented reality layer;

capturing, using the camera, an image of an individual in the field of view of the camera;

sending the captured image to a printer communicably coupled to the mobile device; and printing, using the printer, the captured image with a border of unequal size around the image, wherein printing the capture images comprises printing the captured image upside down to cause a border area larger at a top of the image than around other portions of the image for use in handling the image when using the image as part of a game piece.

2. The method defined in claim 1 further comprising:
triggering a launch of the camera application in response to selecting the game character; and
accessing the overlay from a memory based on the selected game character.

3. The method defined in claim 1 wherein the overlay is a costume associated with the game character.

4. The method defined in claim 1 wherein the printer comprises an Instax Share printer.

5. The method defined in claim 1 wherein the image printed is an Instax print.

6. The method defined in claim 1 further comprising resizing the AR layer based on a size of a human in the field of view of the camera.

7. The method defined in claim 1 wherein sending the captured image to the printer is performed wirelessly.

8. The method defined in claim 1 further comprising incorporating the image printed with the border into a game piece holder.

9. The method defined in claim 8 wherein incorporating the image printed with the border into the game piece holder comprises inserting the image into a slit in the game piece holder.

10. An article of manufacture having one or more non-transitory computer readable storage media storing instructions which when executed by a system causes the system to perform a method comprising:
launching an application on a mobile device that has a camera;
selecting a game character using the application;
displaying, on a display of the mobile device using a camera application, an overlay for the selected game character in an image from a field of view of the camera, the overlay being an augmented reality layer;
capturing, using the camera, an image of an individual in the field of view of the camera;
sending the captured image to a printer communicably coupled to the mobile device; and
printing, using the printer, the captured image with a border of unequal size around the image, wherein printing the capture images comprises printing the captured image upside down to cause a border area larger at a top of the image than around other portions of the image for use in handling the image when using the image as part of a game piece.

11. The article of manufacture defined in claim 10 wherein the method further comprises:
triggering a launch of the camera application in response to selecting the game character; and
accessing the overlay from a memory based on the selected game character.

12. The article of manufacture defined in claim 10 wherein the overlay is a costume associated with the game character.

13. The article of manufacture defined in claim 10 wherein the printer comprises an Instax Share printer and the image printed is an Instax print.

14. The article of manufacture defined in claim 10 wherein the image printed is an instant print.

15. The article of manufacture defined in claim 10 wherein the method further comprises resizing the AR layer based on a size of a human in the field of view of the camera.

16. The article of manufacture defined in claim 10 wherein sending the captured image to the printer is performed wirelessly.

17. A system for generating a game piece for use in game, the system comprising:
a printer; and
a mobile device communicably couplable to the printer and having
a display,
a camera coupled to the display,
one or more processors coupled to the display and the camera,
a memory coupled to the display, the camera and the processor, the memory to store instructions for execution by the one or more processors, wherein the one or more processors are operable to execute the instructions to
launch an application stored in the memory,
enable receipt of an input from the display indicating selection of a game character being displayed on the display using the application,
display, on the display using a camera application, an overlay for the selected game character in an image from a field of view of the camera, where the overlay is an augmented reality layer,
cause the camera to capture an image of a player with a camera,
send the captured image to a printer communicably coupled to the mobile device,
wherein the printer, in response to receiving the captured image, is operable to print the captured image with a border of unequal size around the image and upside down to cause a border area larger at a top of the image than around other portions of the image for use in handling the image when using the image as part of a game piece.

18. The system defined in claim 17 wherein the processor is operable to:
trigger a launch of the camera application in response to selecting the game character; and
access the overlay from a memory based on the selected game character.

19. The system defined in claim 17 wherein the overlay is a costume associated with the game character.

20. The system defined in claim 17 wherein the printer comprises an Instax Share printer.

21. The system defined in claim 17 wherein the image printed is an instant print.

22. The system defined in claim 17 wherein the image printed is an Instax print.

* * * * *